Patented Feb. 4, 1930

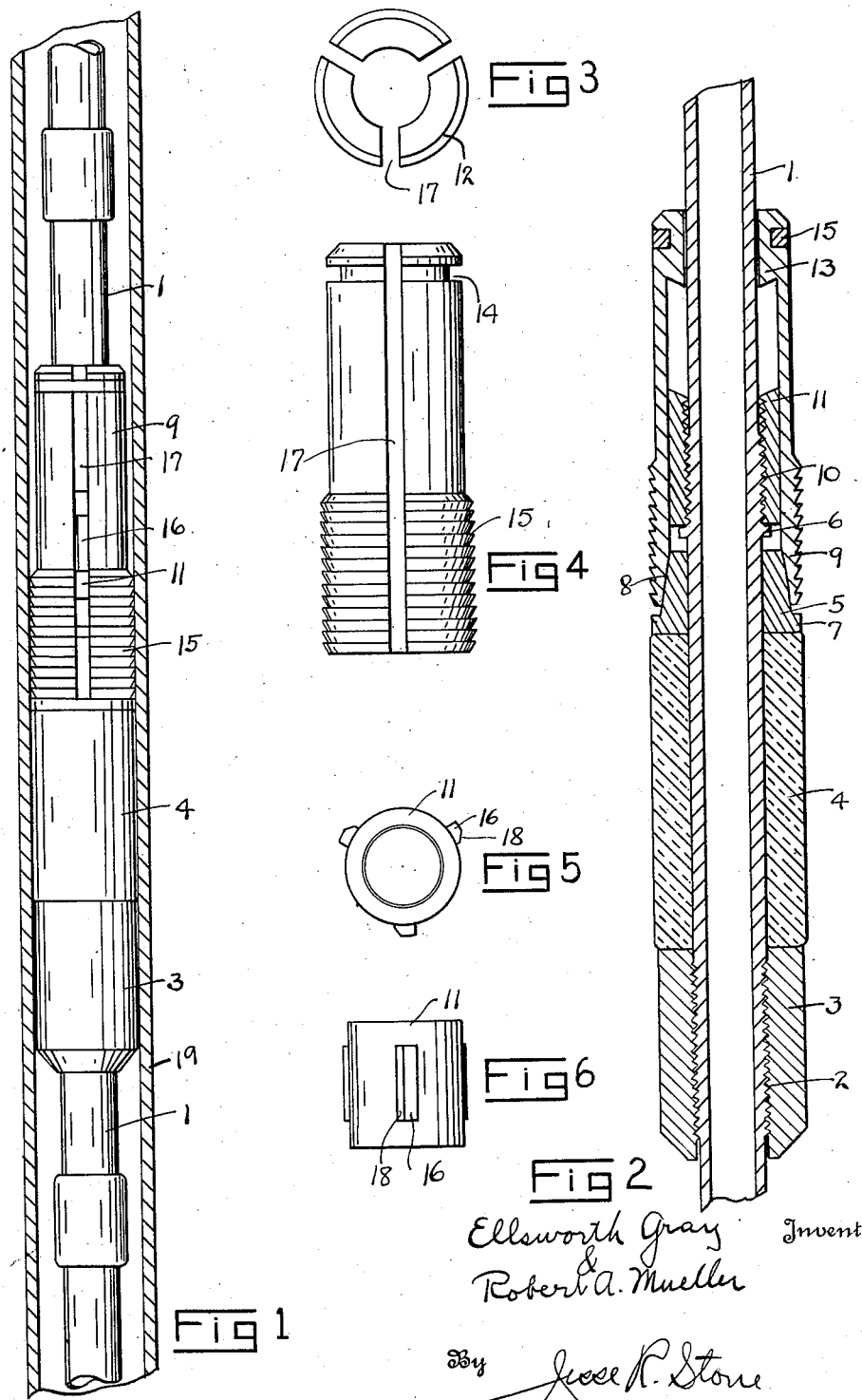
Feb. 4, 1930. E. GRAY ET AL 1,745,572
COMBINED PACKER AND TUBING SUPPORT
Filed July 5, 1927 2 Sheets-Sheet 1

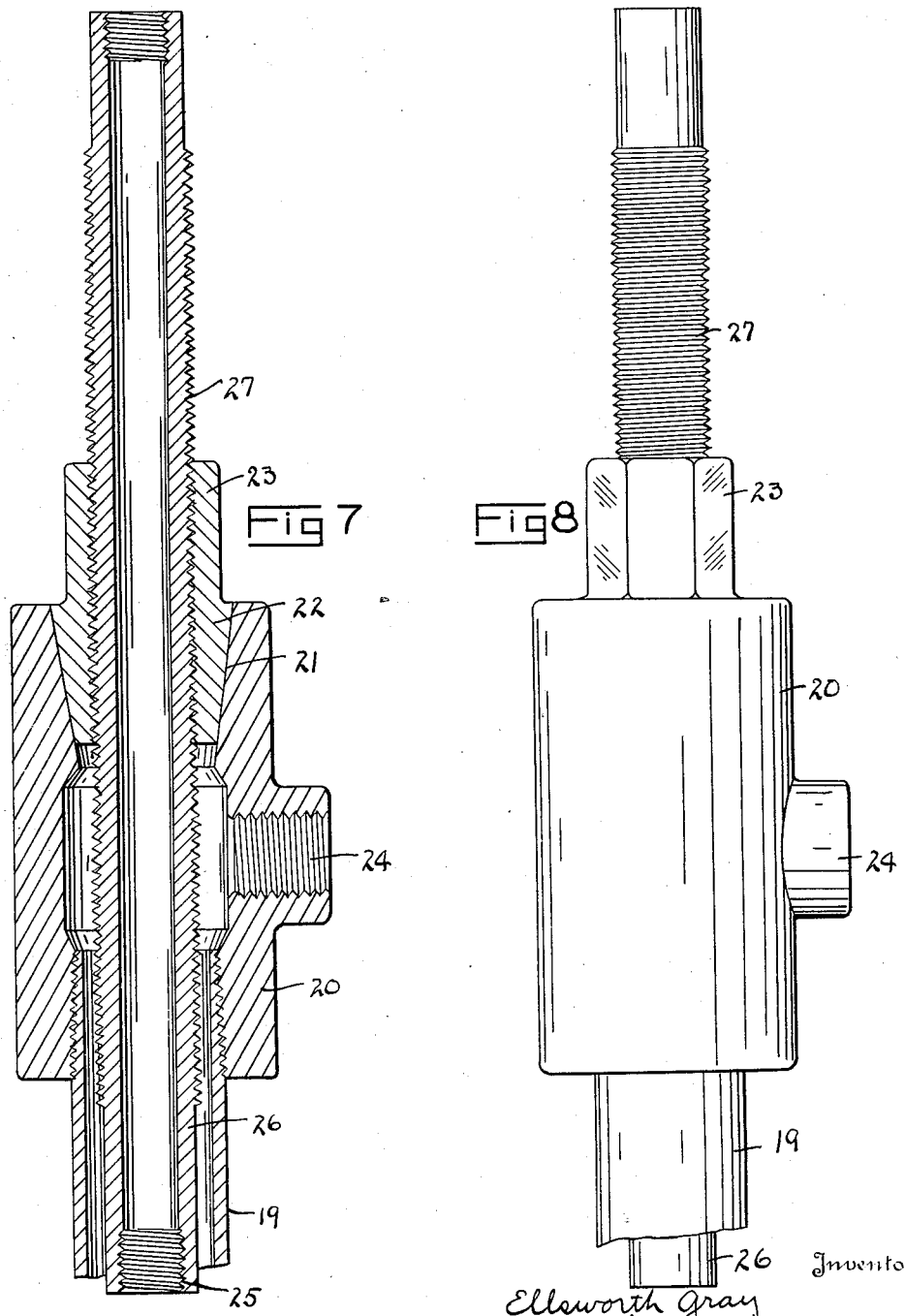

1,745,572

UNITED STATES PATENT OFFICE

ELLSWORTH GRAY AND ROBERT A. MUELLER, OF HOUSTON, TEXAS, ASSIGNORS TO GRAY TOOL COMPANY, OF HOUSTON, TEXAS

COMBINED PACKER AND TUBING SUPPORT

Application filed July 5, 1927. Serial No. 203,575.

Our invention relates to an improved packer to be employed in wells for oil, water and the like, and involves the use of means for supporting the well tubing in the well and for sustaining a proper tension upon the pipe while in the well.

In equipping a well for pumping it is usually desirable to employ a packer about the well tubing to close off the space between the tubing and the casing and to support the tubing in such manner that it will not sway or vibrate during the pumping operation.

It is an object of our invention to provide a means for packing the space outside the tubing and to grip the inner wall of the casing to hold the tubing rigid relative to the casing.

It is also an object to provide means for exerting an upward tension on the tubing so as to hold the tubing from lateral movement.

It is also an object to provide a packer and casing gripping means which may be employed, if desired, for fishing operations to close the space within the pipe to be withdrawn from the well, and to allow the passage of flushing fluid through the device so as to wash the pipe clean of material so that it may be more readily withdrawn.

It is also desired to provide a device of this character which may be released while in the well and allow the same to be withdrawn in case the withdrawal of the device becomes desirable.

Referring to the drawings herewith, Fig. 1 is a side elevation of the packer and pipe gripping means shown within a well casing, said device constituting a part of our invention. Fig. 2 is a central vertical section through the device shown in Fig. 1. Fig. 3 is a top plan view of the pipe gripping elements shown in side elevation in Fig. 4. Fig. 5 is a top plan view and Fig. 6 is a side elevation of a jaw expanding nut employed with our pipe gripping means. Fig. 7 is a central vertical section through the tensioning device to be employed with our invention, and Fig. 8 is a side elevation thereof.

In carrying out our invention we employ a pipe section 1, which is made of heavy material and forms a mandrel or support upon which a pipe gripping means and packer are mounted. This pipe section is threaded at 2 to receive a collar or a nut 3, screwed thereon with the usual right-hand thread. Above the nut 3 the mandrel forms a seat for a sleeve 4 of compressible packing means, such as rubber or similar composition. This sleeve rests upon the upper end of the nut 3 and supports at its upper end a ring 5, slidable along the pipe and limited in its upward movement by a radial flange 6 on the mandrel. The ring 5 has a lower portion 7, which is cylindrical in outline and of a diameter approximately equal to that of the packer sleeve. Above the cylindrical portion the ring is tapered upwardly to provide a conical seat 8 for the pipe gripping elements 9.

Above the flange 6 the mandrel is threaded at 10 to receive a nut 11, whose purpose it is to expand the jaws 9. Above the threaded portion 10, the outer diameter of the pipe is slightly decreased and forms a guide for the upper ends of the jaws, 9.

The jaws 9 are shown best in Figs. 3 and 4. They comprise 3 arcuate plates 12, the upper ends of which are extended inwardly at 13 above the nut 11. The outer surface of the upper ends of the jaws are grooved or recessed at 14 to receive a ring 15', adapted to fit therein and hold the said jaws against the mandrel 1. The lower ends of the jaws are provided with upwardly extending teeth 15, adapted to grip the pipe and resist upward movement of the pipe, as will be later described.

The nut 11 is provided with radial keys 16 which are adapted to extend through the slots 17 between the adjacent jaws and one side of each key is beveled at 18 to bear against the sides of the jaws, and when said nut is rotated in the proper direction (a clockwise direction) the jaws will be forced outwardly towards the pipe.

The mandrel 1 is connected to the tubing which extends to the surface of the ground. The casing 19 has at its upper end a casing head 20 of the usual construction, except that its upper end is tapered downwardly on the interior to form a seat 21 to receive the lower tapered end 22 of a tensioning nut 23. There is a lateral opening 24 in the casing head to receive a pipe as is usual in casing heads.

The upper end of the string of tubing may be connected at 25 to a pipe section 26, threaded on its outer periphery at 27 to screw within the nut 23. A tensioning member is thus provided whereby the tubing may be held taut between the packing member and the casing head.

In the operation of this device the tubing is connected at its upper end to the threaded section 25, and at its lower end is connected to the mandrel 1. The tubing is lowered to the proper position within the well, and in lowering the tubing the jaws 9 will be held inwardly away from the wall of the tubing. The nut 11 will be threaded downwardly upon the mandrel at 10. When the proper position has been reached the tubing will be given an abrupt movement upwardly, which will engage the teeth 15 on the jaws with the casing and the jaws will be moved downwardly on the ring 8 and gripped tightly against the casing. The upward tension on the tubing will carry the ring 5 downwardly against the packer 4, and compress it longitudinally in such manner as to close off the space outside the tubing in an obvious manner.

It will be seen that the jaws will grip the pipe and the packer remain expanded as long as the tension on the pipe is maintained. This tension is provided through the construction shown in Figs. 7 and 8. The nut 22 will be in such position that it will, when the packer is seated, be closely adjacent the casing end. The pipe will be held upwardly to exert tension on the tubing through an elevator or other supporting device, and the nut 22 will then be screwed downwardly on the section 27, into the seat 21, and will then be further rotated until the tubing is drawn taut between the casing end and the packer.

It will be seen that the parts in this position will not only be supported firmly in the well to pack off the space outside the tubing, but the tubing will be held in a particular firm and stable position in the well so that there will be a minimum of sway and vibration during the pumping operation.

If it is desired to remove the structure from the well it will be necessary to allow the jaws 9 to be moved inwardly away from the pipe. This may be accomplished by rotating the pipe in a right-hand direction. Such rotation will tend to rotate the nut 11, which will be held from rotation by the keys 16 engaged between the jaws 9. When the jaws 9 are expanded the keys 16 extend only partially through the slot 17 between the jaws.

The beveled portions 18 on the keys engaging the sides of the jaws will tend to hold them expanded by the cam action of the keys while the mandrel 1 is being rotated and the nut will be forced upwardly on the mandrel to a position above the threaded portion 10 and engaging below the shoulder 13 when the nut will be free and the jaws will be allowed to drop inwardly in a collapsed position, and will be held in that position while the device is withdrawn from the well.

The advantages of this construction will be apparent to those skilled in the art. The device may be easily assembled, and fixed in a well, and when thus installed the device will be held in rigid position, greatly facilitating the operations in the well.

Having thus described our invention, what we claim as new and desire to protect by Letters Patent is:

1. In a device of the character described, a mandrel, a supporting nut thereon, a packer sleeve above said nut, an upwardly tapered ring on said packer sleeve, jaws on said mandrel shaped to seat on said ring and adapted to engage said ring and be expanded when said mandrel is drawn upwardly and thus force said ring against said packer to expand the same.

2. In a device of the character described, a mandrel, a supporting nut thereon, a packer sleeve above said nut, an upwardly tapered ring on said packer sleeve, jaws on said mandrel shaped to seat on said ring and adapted to engage said ring and be expanded when said mandrel is drawn upwardly and thus force said ring against said packer to expand the same, and means to hold said mandrel in elevated position.

3. In a device of the character described, a mandrel, a supporting nut thereon, a packer sleeve above said nut, an upwardly tapered ring on said packer sleeve, jaws on said mandrel shaped to seat on said ring and adapted to engage said ring and be expanded when said mandrel is drawn upwardly and thus force said ring against said packer to expand the same, and means to release said jaws and allow them to collapse, to free said mandrel and packer.

4. In a device of the character described, including a well casing and a tubing therein, the combination of a mandrel on said tubing, slip jaws thereon, means to expand said jaws by an upward pull on said tubing, a threaded upper end on said tubing, and a nut thereon adapted to engage said casing and hold said tubing taut above said jaws.

5. In a device of the character described including a well casing, a casing head thereon, and a tubing in said casing, the combination of a mandrel on said tubing, jaws on said mandrel adapted to be expanded to grip said casing by an upward pull on said tubing, a threaded section at the upper end of said tubing, and a nut on said section adapted to engage said casing head to exert an upward tension on said tubing.

6. In a device of the character described including a well casing, a casing head thereon, and a tubing in said casing, the combination of a mandrel on said tubing, jaws on said mandrel adapted to be expanded to grip said casing by an upward pull on said tubing, a threaded section at the upper end of said tubing, and a nut on said section adapted to engage said casing head to exert an upward tension on said tubing, and means actuated by said jaws when said mandrel is drawn upwardly to close off the space between said tubing and said casing.

7. In a device of the character described including a well casing and a tubing therein, the combination of a mandrel on said tubing, a plurality of pipe-engaging jaws slidable on said mandrel, a nut on said mandrel having keys thereon between said jaws, and a cam surface on each of said keys adapted to engage said jaws and force them outwardly when said mandrel is rotated.

8. In a device of the character described including a well casing and a tubing therein, the combination of a mandrel on said tubing, a plurality of pipe-engaging jaws slidable on said mandrel, a nut on said mandrel having keys thereon between said jaws, and a cam surface on each of said keys adapted to engage said jaws and force them outwardly when said mandrel is rotated, said nut being releasable by the rotation of said mandrel to allow said jaws to collapse away from said pipe.

In testimony whereof we hereunto affix our signatures this 25th day of June, A. D., 1927.

ELLSWORTH GRAY.
ROBERT A. MUELLER.